United States Patent
Noma

[11] 3,802,948
[45] Apr. 9, 1974

[54] THERMAL INSULATION FOR CRYOGENIC CONTAINERS

[75] Inventor: Tetsuo Noma, Osaka, Japan

[73] Assignee: Hitachi Shipbuilding and Engineering Co., Ltd., Osaka, Japan

[22] Filed: June 9, 1971

[21] Appl. No.: 151,234

[52] U.S. Cl.............. 161/160, 161/161, 161/190, 220/9 A, 220/9 LG
[51] Int. Cl......... B32b 3/26, B32b 5/18, B32b 7/02
[58] Field of Search....... 260/2.5 AZ; 161/160, 161, 161/190; 220/9 A, 9 LG

[56] References Cited
UNITED STATES PATENTS

| | | | |
|---|---|---|---|
| 3,546,064 | 12/1970 | Hamilton et al. | 161/190 |
| 3,592,787 | 7/1971 | Robins | 161/190 |
| 3,657,057 | 4/1972 | Shorr | 161/190 |
| 2,956,310 | 10/1960 | Roop et al. | 161/160 |
| 3,072,582 | 1/1963 | Frost | 161/190 |
| 3,088,539 | 5/1963 | Mathues et al. | 161/160 |
| 3,649,324 | 3/1972 | Payne | 161/160 |

Primary Examiner—William J. Van Balen

[57] ABSTRACT

Thermal insulation for the surface of a cryogenic container consists of an inner layer formed by brushing or spraying on the surface a foamable liquid which when cured forms a soft foam having properties of adherence and flexibility at cryogenic temperatures and a relatively non-porous outer skin. An outer layer of rigid plastic foam insulation is foamed in contact with the outer skin of the soft foam layer. This composite insulation construction is resistant to cracking under the thermal stresses encountered in cryogenic service.

5 Claims, 3 Drawing Figures

DISTANCE FROM CONTAINER WALL

THERMAL INSULATION FOR CRYOGENIC CONTAINERS

BACKGROUND OF THE INVENTION

Rigid plastic foam insulation has been widely used for cryogenic containers because it can be easily applied to any shape of container by being foamed in place, and because this foamed insulation adheres firmly to the container wall. However, whenever rigid plastic foam insulation is formed by being foamed in place directly in contact with the container surface, a relatively high density portion generates in the region in contact with the container wall. This high density portion of the foam insulation is brittle, and when cooled cannot withstand the internal thermal stresses resulting from the difference of the thermal expansion coefficients of the insulation and the metal container. Usually, the insulation cracks in the high density portion when cooled down to cryogenic temperatures, and such cracks propagate to a considerable extent inside the insulation. A container for storing low temperature liquids will encounter a great temperature drop when charged with the liquid, and the insulation should be capable of withstanding such a temperature drop without cracking.

The temperature difference, T, which the insulation can withstand, is given by the following formula:

$$T = \sigma_B(1-\nu)/E \cdot \alpha$$

where
- $\sigma_B$: Ultimate tensile strength
- $\nu$: Poisson's ratio
- $E$: Young's modulus
- $\alpha$: Thermal expansion coefficient For the rigid polyurethane foam usually used as insulation for these containers, generally $\sigma_B = 5$ Kg/cm², $E = 200$ Kg/cm² and $\alpha = 7 \times 10^{-5}/°C$; and, assuming $\nu = 0.3$, then T = 250°C. When this rigid polyurethane foam is applied by the process of foaming in place, the portion in contact with the container wall results in having a high density and a great value of $E$. The generation of this high density portion cannot be avoided when the conventional foaming in place process is used.

Therefore, although T is generally 250°C for the rigid polyurethane foam, T is greatly reduced in the high density portion in contact with the container wall where E is greater than 200 Kg/cm², so that this portion cannot withstand the temperature difference of about 200°C caused when storing a low temperature liquid such as liquefied methane.

SUMMARY OF THE INVENTION

The present invention overcomes the above-mentioned problems. The object of the invention is to prevent the generation of a high density portion (with a great E value) in contact with the container wall and thereby prevent the generation of cracks in rigid plastic foam insulation applied to a container for low temperature service by the foaming in place process.

In accordance with the invention, a thermal insulation composition for a surface of a cryogenic container comprises a foamable liquid coating material applied to said surface and cured to form a soft foam layer having a relatively non-porous outer skin and retaining adhereability to said surface and flexibility at cryogenic temperatures. A layer of rigid plastic foam insulation is applied to the outer skin of the soft foam layer, preferably by the foaming in place method.

In this insulation composition of the invention, the soft plastic foam layer with a low Young's modulus is in contact with the container surface subject to great temperature changes, and the rigid plastic foam insulation applied to the outer skin of the soft foam layer does not have a high density portion with a great E value in the region in contact with the soft plastic foam layer yet adheres securely thereto. The result is to increase the temperature difference, T, which the insulation can withstand without cracking.

The invention also includes a preferred composition for a foamable liquid coating material which can be applied to the container wall at ordinary temperatures by brushing or spraying, and which will cure to form a soft foam layer in a relatively short period of time. This liquid coating material enables the insulation work to be done easily and efficiently.

DESCRIPTION OF THE PREFERRED EMBODIMENT

Figure 1:
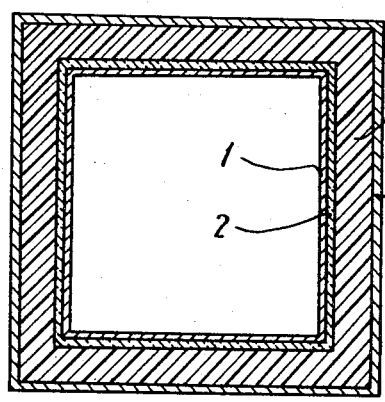
FIG. 1 is a schematic sectional view of a low temperature liquified gas container insulated in accordance with the invention.
Figure 2:
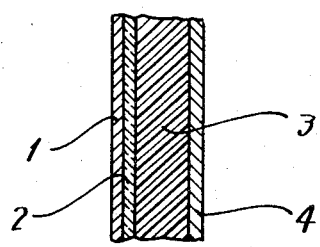
FIG. 2 is an enlarged sectional view of a portion of the construction shown in FIG. 1; and, FIG. 3 is a graph showing the relation between the thickness and the density of the insulation.

In FIG. 1, a container 1 is made out of aluminum or steel that is capable of withstanding low temperatures. A foamable liquid coating material, such as hereinafter described in detail, is applied to the outer surface thereof by brushing or spraying and allowed to cure at ordinary temperature for approximately 24 hours. The coating material foams and increases in volume two to three times thereby forming a thin (about 3mm) soft layer 2. Thereafter, plywood 4 is placed around the container to form a void space with a clearance corresponding to the desired insulation thickness, and rigid polyurethane foam stock liquid is poured into this void space where it foams to form the insulation layer 3.

A presently preferred composition for the foamable liquid coating material for forming the soft layer 2 is given below, this liquid being preferably composed of two solution, A and B, with the quantity of each substance in each of these solutions being given in parts by weight.

| Composition of A - solution | | |
|---|---|---|
| Prepolymer I | (see Note 1) | 37 parts |
| Prepolymer II | (see Note 2) | 30 parts |
| Prepolymer III | (see Note 3) | 20 parts |
| Trichlorofluoromethane | | 13 parts |
| Composition of B - solution | | |
| Polyol GP3025 | (see Note 4) | 15 parts |
| 3, 3' dichloro- 4, 4' diamino diphenylmethane | | 4 parts |
| Dibutyl-tin-dilaurate | | 1 part |
| Triethylene diamine | | 0.02 parts |
| Silicone oil (see Note 5) | | 0.3 parts |

Note 1: Reaction product, manufactured by Mitsui Kagaku Co., Ltd., Japan, of 1 mol of glycerine-mixed polyoxypropylene triol (molecular weight: 3,000) and 3 mols of 3 mols of T.D.I. (tolylenediisocyanate, isomer ratio: 2, 4/2, 6= 80/20). (isomer ratio: 2.4/2.6 = 8/20).

Note 2: Reaction product, manufactured by Asahi Chikka Co., Ltd., Japan, of 1 mol of Adeka polyether P-1000 (polyoxy-propylene glycol; molecular weight: 1000) and 2 mols of said T.D.I.

Note 3: Adiprene L-100 (manufactured by DuPont de Nemours & Co., U.S.A.).
Note 4: Grycerine-mixed polyoxypropylene triol, manufactured by Mitsui Toatsu Kagaku Co., Ltd., Japan.
Note 5: L-520, manufactured by Union Carbide Corporation, U.S.A.

The two solutions A and B, described above, are mixed together to produce the liquid coating material. This coating material can be applied at room temperature during a 30 minute period, 30–60 minutes after mixing. The soft foam layer 2 made from this material remains flexible and has strong adhesion to metal, even when immersed in liquified nitrogen.

The composition of the foamable liquid coating material is not limited to that described above, but any liquid material may be used provided that it is foamable and flexible at low temperatures, has superior adhering properties and preferably forms a relatively non-porous skin on the outer surface when foamed.

The insulation structure of the invention is not limited in application to the outside of the container wall, but may of course be applied to the inside wall of the container. This insulation structure has superior capabilities of withstanding cryogenic temperatures. For example, an aluminum container provided with this insulation structure and filled with liquified nitrogen does not show any defect such as cracks in the insulation after a long storage period. If such a container is covered with a suitable sheathing for the protection of the rigid foam insulation against moisture and damage, and equipped with a suitable means for charging and discharging of cryogenic liquids, the container may be effectively used for the storing or transporting of liquified ethylene, methane and the like on land or in a cargo ship.

Figure 3:
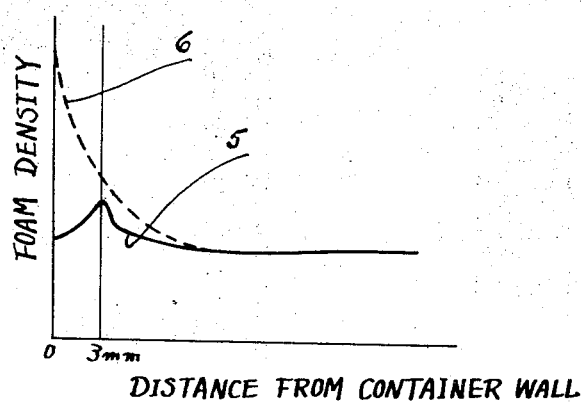

A comparison of insulation constructed in accordance with the present invention and insulation made by the conventional method of foaming rigid plastic foam insulation directly on a container wall is shown in FIG. 3 wherein the solid line 5 represents the density characteristics of the insulation composition of the invention and the dotted line 6 the characteristics of the conventional insulation.

FIG. 3 clearly indicates that with the composition of the invention, the formation of a high density portion in the insulation can be nearly eliminated as compared with the conventional insulation. The invention thereby provides an insulation composition in which these desirable density properties can be obtained by foaming in place techniques which can easily be performed.

1. A thermal insulation composition for the surface of a cryogenic container comprising a foamable liquid coating material applied to said surface and cured to form an inner soft foam layer adhering to said surface and having flexibility at cryogenic temperatures, a sheathing member of plywood spaced from said soft foam layer, and an outer layer of rigid plastic foam insulation foamed in contact with said soft foam layer and said sheathing member.

2. A thermal insulation composition according to claim 1 wherein said liquid coating material comprises the following substances mixed in substantially the quantities given by weight:
   a. glycerine-mixed polyoxypropylene triol reacted with tolylenediisocyanate (isomer ratio: 2,4/2,6 = 80/20), 37 parts;
   b. polyoxy-propylene glycol reacted with tolylenediisocyanate (isomer ratio: 2,4/2,6 = 80/20), 30 parts;
   c. liquid urethane elastomer, 20 parts;
   d. trichlorofluoromethane, 13 parts;
   e. glycerine-mixed polyoxpropylene triol, 15 parts;
   f. 3, 3' dichloro-4, 4' diamino diphenylmethane, 4 parts;
   g. dibutyl-tin-dilaurate, 1 part;
   h. triethylene diamine, 0.02 parts;
   i. silicone oil, 0.3 parts.

3. A thermal insulation composition according to claim 2 wherein said substances (a), (b), (c) and (d) are mixed together to form a first solution, and said substances (e), (f), (g), (h) and (i) are mixed together to form a second solution, said first and second solutions being combined to form said liquid coating material.

4. A thermal insulation composition according to claim 2 wherein said substance (a) is the reaction product of 1 mol of glycerine-mixed polyoxypropylene and 3 mols of tolylene diisocyanate.

5. A thermal insulation composition according to claim 4 wherein said substance (b) is the reaction product of 1 mol of polyoxy-propylene glycol and 2 mols of tolylene diisocyanate.

* * * * *

UNITED STATES PATENT OFFICE
CERTIFICATE OF CORRECTION

Patent No. 3,802,948  Dated April 9, 1974

Inventor(s) Tetsuo Noma

It is certified that error appears in the above-identified patent and that said Letters Patent are hereby corrected as shown below:

Column 2, in Note 1, line 4 cancel "(isomer ratio 2.4/2.6=8/20)"; line 3, "2,4/2, 6=80/20" should read -- 2.4/2.6,=8/20 --. Column 3, line 1, after Note 3: insert -- A liquid urethane elastomer such as --.

Signed and sealed this 15th day of October 1974.

(SEAL)
Attest:

McCOY M. GIBSON JR.
Attesting Officer

C. MARSHALL DANN
Commissioner of Patents